United States Patent
Sundarajan et al.

(10) Patent No.: US 11,354,739 B2
(45) Date of Patent: Jun. 7, 2022

(54) DETECTION OF MARKET ABUSE PATTERNS BY ARTIFICIAL INTELLIGENCE

(71) Applicant: International Business Machines Corporation, Armonk, NY (US)

(72) Inventors: Balaji Rishi Sundarajan, Hyderabad (IN); Sharath C Athrey, Bangalore (IN); Mohan Nagraj Dani, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 16/933,024

(22) Filed: Jul. 20, 2020

(65) Prior Publication Data
US 2022/0020087 A1 Jan. 20, 2022

(51) Int. Cl.
G06Q 40/04 (2012.01)
G06Q 20/40 (2012.01)
G06N 20/00 (2019.01)
G06T 11/20 (2006.01)

(52) U.S. Cl.
CPC ............ G06Q 40/04 (2013.01); G06N 20/00 (2019.01); G06Q 20/4016 (2013.01); G06T 11/206 (2013.01)

(58) Field of Classification Search
CPC .......................... G06Q 20/4016; G06Q 40/04
USPC ........................................................ 705/37
See application file for complete search history.

(56) References Cited

U.S. PATENT DOCUMENTS

| | | | |
|---|---|---|---|
| 10,552,837 B2 | 2/2020 | Jia | |
| 2011/0206198 A1* | 8/2011 | Freedman | H04M 3/51 |
| | | | 379/265.03 |
| 2015/0066721 A1 | 3/2015 | Mandelli | |
| 2015/0081504 A1* | 3/2015 | Janas | G06Q 40/04 |
| | | | 705/37 |
| 2015/0081505 A1* | 3/2015 | Co | G06Q 40/04 |
| | | | 705/37 |
| 2016/0253672 A1 | 9/2016 | Hunter | |
| 2016/0253679 A1* | 9/2016 | Venkatraman | G06Q 30/0185 |
| | | | 705/310 |
| 2017/0017760 A1* | 1/2017 | Freese | G06F 16/24578 |
| 2017/0017887 A1* | 1/2017 | Waradkar | G06Q 40/00 |
| 2017/0124650 A1 | 5/2017 | Austin | |

(Continued)

OTHER PUBLICATIONS

Zaki et al., "Analyzing Stock Market Fraud Cases Using a Linguistics-Based Text Mining Approach", FEOSW 2014, downloaded from the internet on May 19, 2020, 12 pages, <http://ceur-ws.org/Vol-1240/feosw2014-paper2.pdf>.

(Continued)

Primary Examiner — Lindsay M Maguire
(74) Attorney, Agent, or Firm — Monchai Chuaychoo

(57) ABSTRACT

An approach for training a machine learning model to detect market abuse patterns based on graphical images is disclosed. The approach comprises of creating trade event graphical images based on one or more rules and creating trade risk event graphical images represented by one or more horizontal lines and one or more vertical lines wherein the one or more vertical lines are based on unstructured data. The approach trains a model of a machine learning network to detect market abuse patterns based on the trade event graphical images and the trade risk event graphical images.

20 Claims, 11 Drawing Sheets

(56) References Cited

U.S. PATENT DOCUMENTS

2018/0211317 A1  7/2018 Chiong
2019/0102375 A1* 4/2019 Goulikar ................. G06N 3/02

OTHER PUBLICATIONS

Malakian, Anthony, "Machine Learning Takes Hold in the Capital Markets: Some Examples", WatersTechnology, Dec. 23, 2019, 15 pages, <https://www.waterstechnology.com/trading-tools/4735996/machine-learning-takes-hold-in-the-capital-markets-some-examples>.

* cited by examiner

- Fixed size slot to indicate the trader's risk score
- Different colors for high, medium and low 422
421
423

- Variable length based on the volume
- Color based on type & direction

- Fixed size slot to indicate the comm risk level
- Different colors for high, medium and low
- This area can be further divided into multiple segments for different communication indicators if required

- Start and end times of the event determine the starting position and height of the line
- Different colors for high, medium and low risk levels
- Use gradients to show increase or decrease

US 11,354,739 B2

DETECTION OF MARKET ABUSE PATTERNS BY ARTIFICIAL INTELLIGENCE

BACKGROUND

The present invention relates generally to software, and more particularly to a method for detecting trading market abuse pattern by the use of AI (Artificial Intelligence).

Market abuse is a practice in trade market where in traders try to manipulate the market to their benefit. It is regulated by government agencies in most countries. The brokerage firms are asked to monitor the transactions and report any potential abuse cases to the agency. Most of the trade market abuse scenarios involve a specific pattern of transactions with respect to, a) the type of transaction (e.g., order, execution, cancellation, etc.), b) the kind of transaction (buy/sell) and c) the timing between the transactions that the pattern and d) volume and number of transactions is comprised.

SUMMARY

Aspects of the present invention disclose a computer-implemented method, a computer system and computer program product for training a machine learning model to detect market abuse patterns based on graphical images. The computer implemented method may be implemented by one or more computer processors and may include creating trade event graphical images based on one or more rules; creating trade risk event graphical images represented by one or more horizontal lines and one or more vertical lines wherein the one or more vertical lines are based on unstructured data; and training a model of a machine learning network to detect market abuse patterns based on the trade event graphical images and the trade risk event graphical images.

According to another embodiment of the present invention, there is provided a computer system. The computer system comprises a processing unit; and a memory coupled to the processing unit and storing instructions thereon. The instructions, when executed by the processing unit, perform acts of the method according to the embodiment of the present invention.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE DRAWINGS

Preferred embodiments of the present invention will now be described, by way of example only, with reference to the following drawings, in which:

FIG. 4B represents the horizontal graphical representation from FIG. 4A, in accordance with an embodiment of the present invention;

FIG. 4C represents the vertical graphical representation from FIG. 4A, in accordance with an embodiment of the present invention;

DETAILED DESCRIPTION

Figure 1:
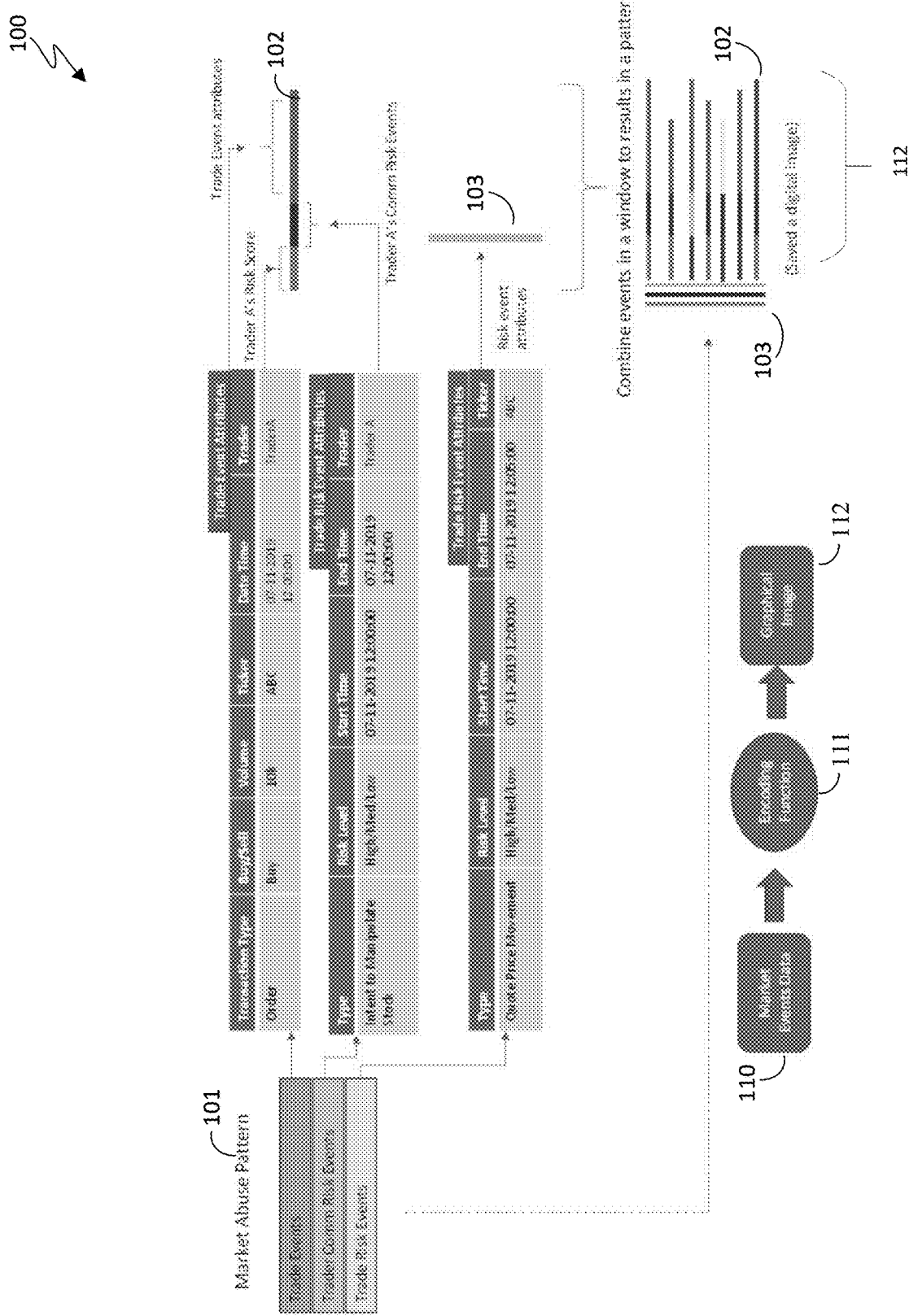
FIG. 1 is a functional block diagram illustrating a high-level overview of the market abuse pattern and the equivalent graphics representation in accordance with an embodiment of the present invention.

Embodiments of the present invention provides an approach for detecting trading market (e.g., equity, bonds, currencies, commodities, derivatives, etc.) abuse pattern by creating graphical images. The graphical images have each pixel (or line of pixels) representing a financial transaction (i.e., an event). Each line derives its attributes (e.g., color, direction, thickness and position in the image) from the attributes of the transaction (e.g., transaction type, buy/sell etc.). The final image will be a graphical representation of the pattern (see FIG. 3). Multiple patterns can be created for a specific market abuse scenario based on the possible variations. These images can then be used to train machine learning models that can use pattern recognition to detect market abuse scenarios in day to day trade transaction.

In another embodiment, an approach relies graphical image analysis to detect patterns of suspicious trade transactions for one single entity (i.e., one company). The time window of the activities being monitored can be adjustable since certain detecting different patterns of activities can vary on different time duration. For example, such as spoofing, may take a few minutes to hours. However, most of the market abuse patterns, utilized by the approach, are applicable for one ticker of that one single entity. The approach can be used by brokerage firms to detect market abuse scenarios or it can be used as a part of a user interface of a trading system/platform. For example, an internal auditor (within a brokerage firm) can utilize the embodiment to make sure traders are not misusing the financial market to their advantage. Thus, the brokerage firm can blacklist specific traders based on their market abuse patterns.

Embodiments of the present invention may recognize one or more of the following facts, potential problems, potential scenarios, and/or potential areas for improvement with respect to the current state of the art: i) it does not detect suspicious trades and market abuse patterns directly from structured data analysis (i.e., approach can use unstructured data for analysis), ii) does not work on market snapshots (i.e., not real time data) taken at the same time as the orders. It learns from patterns taken from historical data and those created by subject matter experts and learns them through machine learning techniques. This knowledge is then used to classify new patterns in the transaction data, iii) does not specifically deal with news events, and iv) does not deal with data from social media. It is noted that if there are available market news and social media content available, both can be used to generate risk indicators to encode graphical representations (e.g., vertical, and/or horizontal lines).

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

It should be understood that the Figures are merely schematic and are not drawn to scale. It should also be understood that the same reference numerals are used throughout the Figures to indicate the same or similar parts.

FIG. 1 is a functional block diagram illustrating a high-level overview of the market abuse pattern and the equivalent graphical image (i.e., 112), in accordance with an embodiment of the present invention. Embodiment of the present invention converts, via encoding function 111, market data (110) into graphical image 112. Graphical image 112 can include horizontal line 102 and vertical line 103. Market Abuse pattern (i.e., 101) can include the following, but is not limited to, a) trade events, b) trader communication risk events and c) trade risk events.

Figure 2:
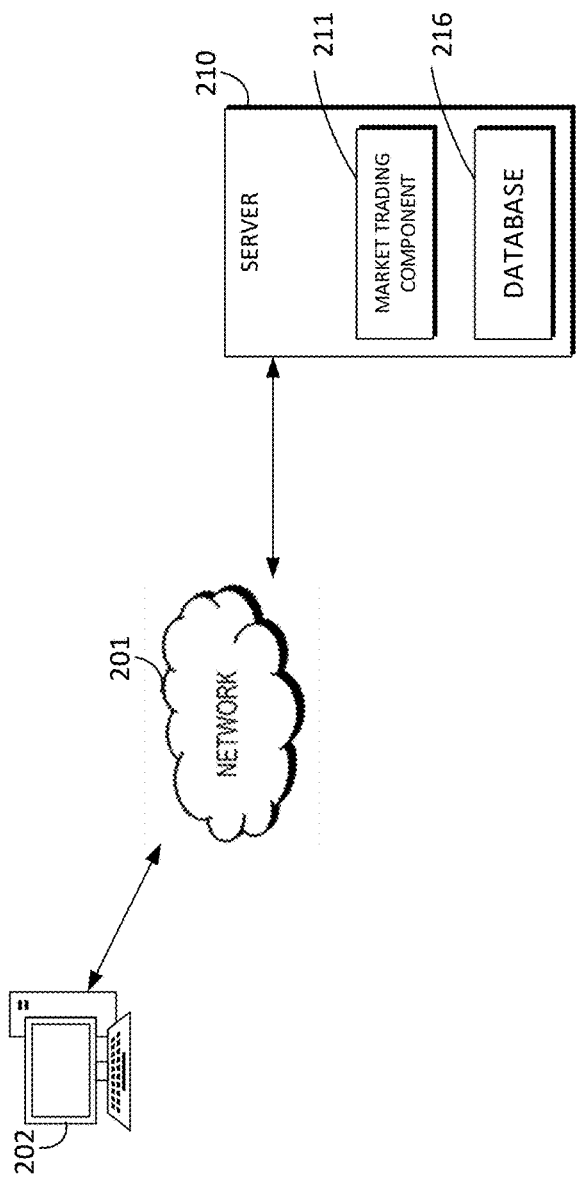
FIG. 2 is a functional block diagram illustrating a market trading environment, in accordance with an embodiment of the present invention.

FIG. 2 is a functional block diagram illustrating a market trading environment in accordance with an embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

Market trading environment includes product network 201, client computing device 202 and server 210.

Network 201 can be, for example, a telecommunications network, a local area network (LAN), a wide area network (WAN), such as the Internet, or a combination of the three, and can include wired, wireless, or fiber optic connections. Network 201 can include one or more wired and/or wireless networks that are capable of receiving and transmitting data, voice, and/or video signals, including multimedia signals that include voice, data, and video information. In general, network 201 can be any combination of connections and protocols that can support communications between server 210, Client computing device 202 and other computing devices (not shown) within market trading environment. It is noted that other computing devices can include, but is not limited to, client computing device 202 and any electromechanical devices capable of carrying out a series of computing instructions.

Server 210 and client computing device 202 can be a standalone computing device, a management server, a web server, a mobile computing device, or any other electronic device or computing system capable of receiving, sending, and processing data. In other embodiments, server 210 and client computing device 202 can represent a server computing system utilizing multiple computers as a server system, such as in a cloud computing environment. In another embodiment, server 210 and Client computing device 202 can be a laptop computer, a tablet computer, a netbook computer, a personal computer (PC), a desktop computer, a personal digital assistant (PDA), a smart phone, or any other programmable electronic device capable of communicating other computing devices (not shown) within market trading environment 100 via market abuse pattern 101. In another embodiment, server 210 and Client computing device 202 represents a computing system utilizing clustered computers and components (e.g., database server computers, application server computers, etc.) that act as a single pool of seamless resources when accessed within market trading environment.

Client computing device 202 can be a computing device with the capability of interfacing to live/real time or historical market data from stock exchanges (e.g., NYSEX, NASDAQ, etc.), bond market, derivatives, or any financial related market.

Embodiment of the present invention can reside on server 210. Server 210 includes market trading component 211 and database 216.

Market trading component 211 provides the capability of i) encoding financial market data (i.e., transaction related) into a graphical representations to determine market abuse and ii) using the graphical representation to train a machine learning model to recognize that market abuse scenarios in a day-to-day trade transaction.

Database 216 is a repository for data used by market trading component 211. Database 216 can be implemented with any type of storage device capable of storing data and configuration files that can be accessed and utilized by server 210, such as a database server, a hard disk drive, or a flash memory. Database 216 uses one or more of a plurality of techniques known in the art to store a plurality of information. In the depicted embodiment, database 216 resides on server 210. In another embodiment, database 216 may reside elsewhere within market trading environment, provided that market trading component 211 has access to database 216. Database 216 may store information associated with, but is not limited to, market abuse pattern models, historical market data, risk indicators for all companies and/or markets, benchmark datasets and testing datasets associated with models, each trader's profile and information and unstructured data associated with trader communication. For example, unstructured data can be in a form of a risk indicators where the risk indicator are computed using text analytics or any other technique on the email content belonging to the traders and relevant parties to the transactions.

Figure 3:
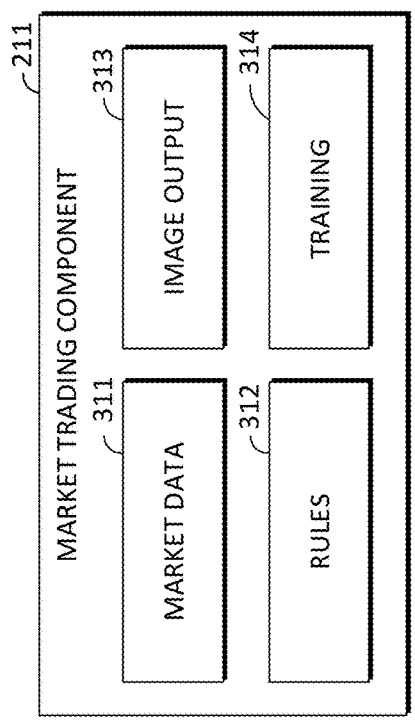
FIG. 3 is a functional block diagram illustrating the subcomponents of market trading component 211, in accordance with an embodiment of the present invention.

FIG. 3 is a functional block diagram illustrating market trading component 211 in accordance with an embodiment of the present invention. In the depicted embodiment, market trading component 211 includes market data component 311, rules component 312, image output component 313 and training component 314.

As is further described herein below, market data component 311 of the present invention provides the capability of receiving market related data from various repositories. The market data can include, but it is not limited to, live day-to-day transactions and historical transactions.

Figure 4A:
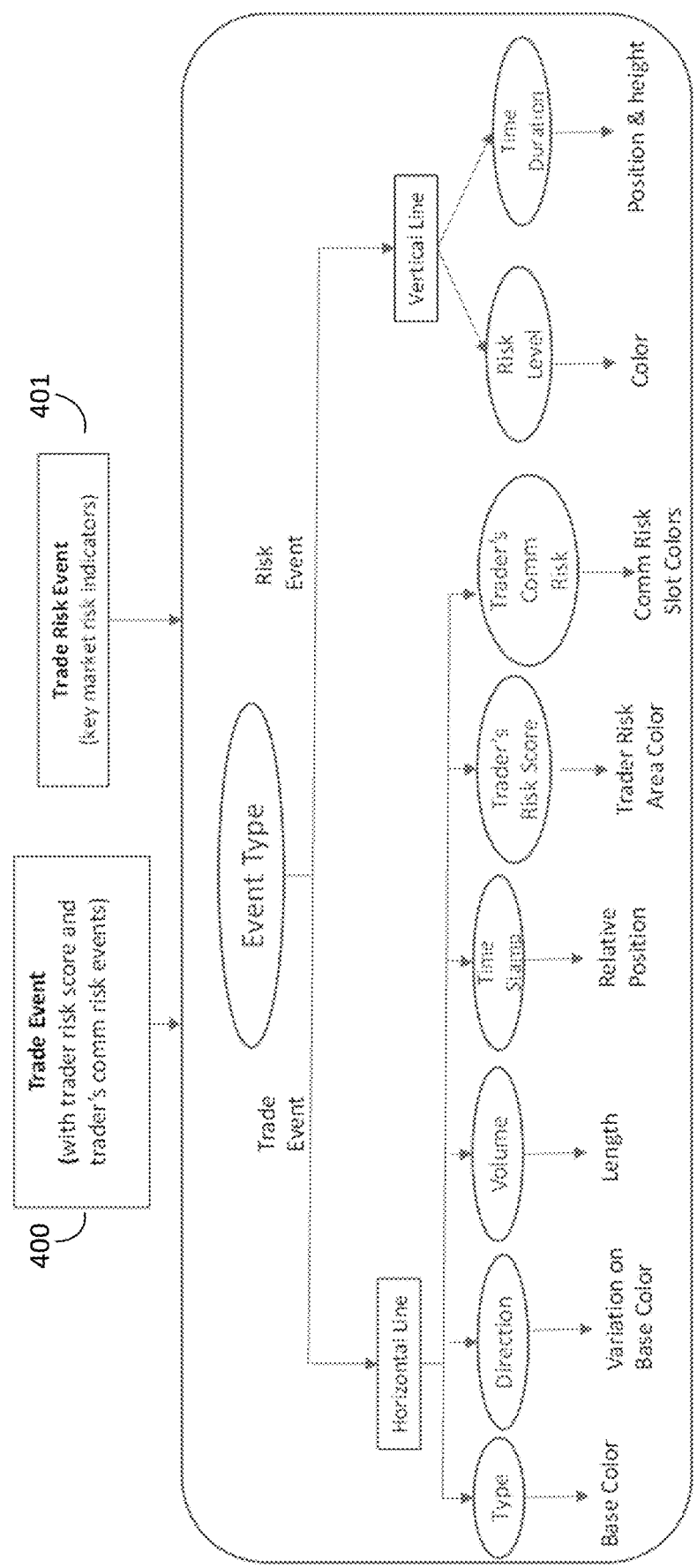
FIG. 4A represents rules and concepts of coding graphical representation of trade and risk events, in accordance with an embodiment of the present invention.

As is further described herein below, rules component 312 of the present invention provides the capability of creating, modifying and managing rules related to, a) coding market transactions and/or events and b) coding of market abuse patterns. Rule (a), associated with coding market transaction and events will be discussed first. These rules define what graphical characteristics, such as, color, length and relative position, can be used to represent the transactions (see FIG. 4A). The transactions (e.g., trade events 400 and trade risk events 401) can be represented by lines, circles, bar graphs, etc. Trade events can be defined as a combination of trader's risk score and trader's comm. risk events. Trade risk events can be defined as key market risk indicators. Trader's com (communication) risk can be defined as risk computed from e-communication of the traders.

Current embodiment uses lines (e.g., vertical and/or horizontal lines) to demonstrate transactions. For example, related to a trade event and/or a trade risk event, a horizontal line (i.e., horiz line 420 of FIG. 4B) can be used. The horizontal line can be characterized by the following table, Table 1 and FIG. 4B. Furthermore, the horizontal line can be defined with additional rules as it relates to different parts of the horizontal line (e.g., 421, 422 and 423).

TABLE 1

| Type | Direction | Volume | Time Stamp | Trader's Risk Score | Trader's Comm. Risk |
|---|---|---|---|---|---|
| Base color | Variation on base color | Length | Relative Position | Trader Risk Area color | Comm. Risk slot colors. |

FIG. 4B illustrates a horizontal line (i.e., horiz line 420) with possible characteristics based on the rule from Table 1. Additionally, FIG. 4B shows the breakdown of possible encoding rules that can be used for different parts of the horizontal line. For example, left 421 (trader's risk score) of the horizontal line can use the following rules: i) fixed size slot to indicate the trader's risk score, ii) different colors for high, medium and low. Middle 422 (comm risk level) of the horizontal line can utilize the following rules: iii) fixed sides slot can be used to indicate the comm. (communication) risk level, iv) different colors can be used for high, medium or low and v) area can be further divided into multiple segments for different communication indicators if required. Right 423 (volume) of the horizontal line can utilized the following rules: vi) variable length based on the volume and vii) color based on type and direction. It is noted that middle 422 (i.e., encoding communication risk) will be discussed in further details later. Trader's risk score, represented by left 421, can be based on the following rule: a) past history of alerts and/or behavioral conduct by the trader. It is noted that trader's risk score is not mandatory to detect market abuse, but if available, provides additional information to cluster out higher risk patterns.

A vertical line (i.e., vert line 430 of FIG. 4C) can be characterized by the following table, Table 2 and FIG. 4C. FIG. 4C illustrates a vertical line (i.e., 430) with possible characteristics based on the rule from Table 2. Additionally, FIG. 4C shows the breakdown of possible encoding rules that can be used for different parts of the vertical line. For example, vertical line can use the following rules: viii) start and end time of the vent determines the starting position and height of the line, ix) different colors can be used for high, medium and low risk levels and x) gradients can be used to show increase or decrease.

TABLE 2

| Risk Level | Time Duration |
|---|---|
| Color | Position and height |

Trader's comm. risk (i.e., middle 422 of FIG. 4B) is generally computed from e-communications of traders and is expressed in term of risk indicators, such as, i) intent to manipulate the stock, ii) intent to communicate offline and iii) intent to use insider information. Adding e-comm risk to the pattern makes the definition of the pattern more specific thus improving the accuracy of predictions. It also helps in clustering higher risk patterns from the others. Information about recently identified communication risk events can be encoded as part of the pattern in two ways: i) at a trade event level, add a colored block (e.g., yellow to represent intent to manipulate the stock, red to represent intent to communicate offline and green to represent the intent to use insider information) to the comm risk event area of the horizontal line representing the trade event, ii) at a pattern level, use height of the vertical line to represent duration of the time. For example, some risk indicators influence the market abuse pattern, but they are not caused by the specific orders or executions performed by the trader and hence cannot be made part of the horizontal lines. In the example shown in the FIG. 4B, if there is negative news about an organization, the stock prices of that organization will be impacted. This will result in fraudsters making use of this situation to commit market abuse. Thus, risk indicator is represented as a vertical line with the height showing the duration of time that the indicator is valid for during the course of the pattern. The color of the line indicates the risk level such as high, medium or low. It is noted that some patterns may not involve comm risk or such data may not be available during detection. Thus, in such cases the comm. area is encoded using a standard color for all trade events. It is noted that some risk indicators influence the market abuse pattern but they are not caused by the specific orders or executions performed by the trader and hence cannot be made part of the horizontal lines. In the example shown in the Figure, if there is negative news about a particular organization, the stock prices of that organization will be impacted. This will result in fraudsters making use of this situation to commit market abuse. In such cases, the risk indicator is represented as a vertical line with the height representing the duration of time that the indicator is valid for during the course of the pattern. The color of the line indicates the risk level such as high, medium or low.

Rule (b), coding of market abuse patterns (referring to FIG. 5) will now be discussed. The following method for representation (i.e., encoding/coding market abuse patterns) is for an instance of one such window: 1) select a time duration (in minutes or seconds) in which the market abuse pattern is expected to be detected; 2) encode the risk events relevant to the market abuse scenario in the given time window as described in claim 1. The outcome is a line for each event, with its line attributes; 3) add an additional attribute of image co-ordinates to each line, such as, a) risk events start from the left most x-coordinate, b) the start and end y-coordinates are decided by the start and end time of the event and c) The size of the window and the frequency of the events would decide the scale to be used for the y axis; 4) encode each trade event in the window using the encoding function as described by rule (a). The outcome is a line with its attributes; 5) sort the events in chronological order of occurrence in the market, with the earliest on the top; 6) add an additional attribute of image co-ordinates to each line in the sorted list, starting from the top of the list, a) the type of event (trade vs risk) and the time of occurrence of the event decide the position of the line and b) the size of the window and the frequency of the events would decide the scale to be used for spacing the co-ordinates. The distance between the lines will indicate the time between the events; 7) add the market open and market close events to the list of events if the window under consideration is likely to include the market open or close times. These events are represented as a special (reserved) pattern of dot-dashed line (market open) and dashed line (market close).

Figure 5A:
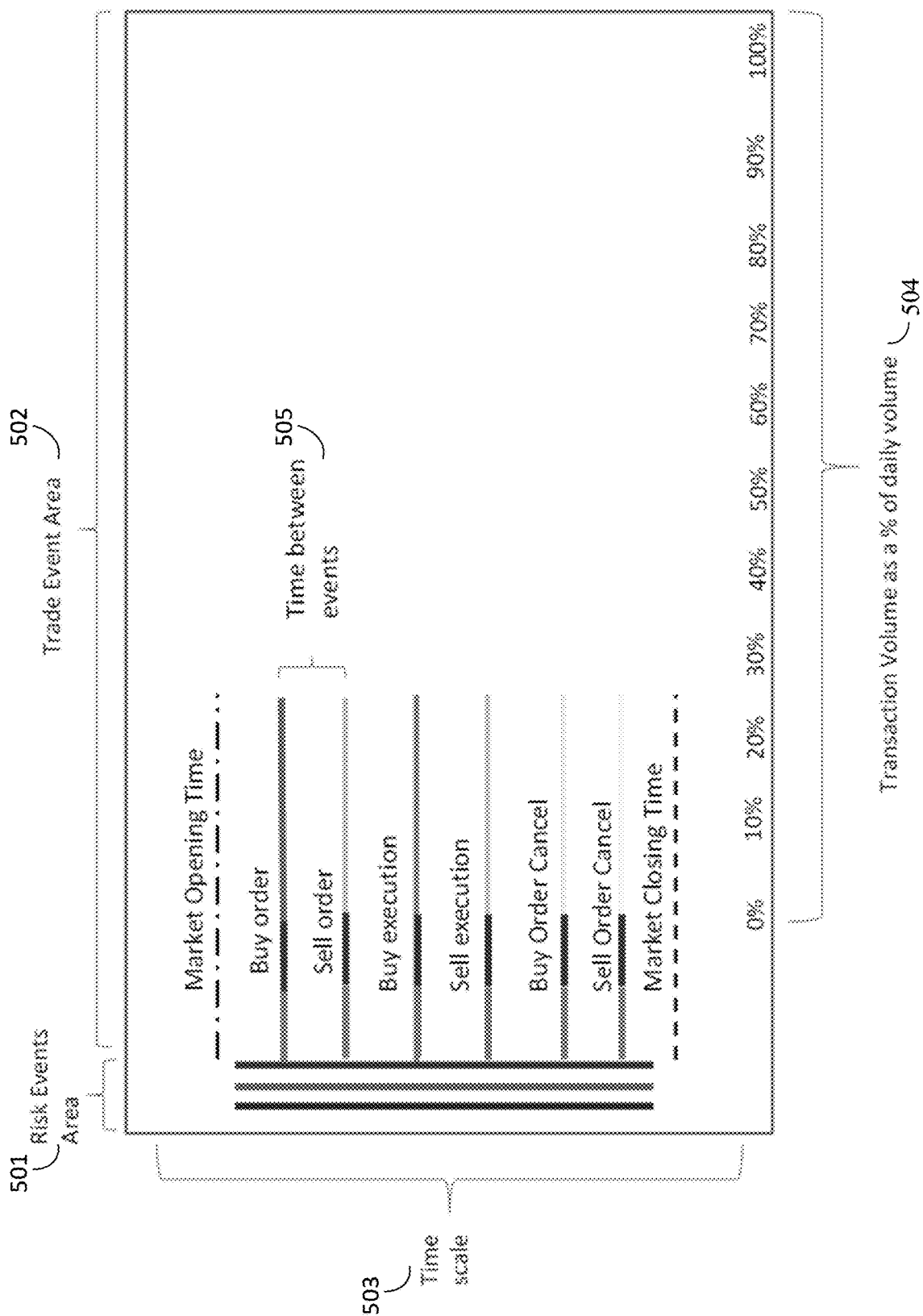
FIG. 5A represents rules and concepts of encoding graphical representation of market abuse pattern, in accordance with an embodiment of the present invention.

FIG. 5A, represents a typical trade transaction that can be used to encode graphical representation of market abuse pattern, in accordance with an embodiment of the present invention. For example, FIG. 5A includes, trade event area 502, risk events area 501, time scale 503, time between events 505 and transaction volume as % of daily volume 504.

Figure 5B:
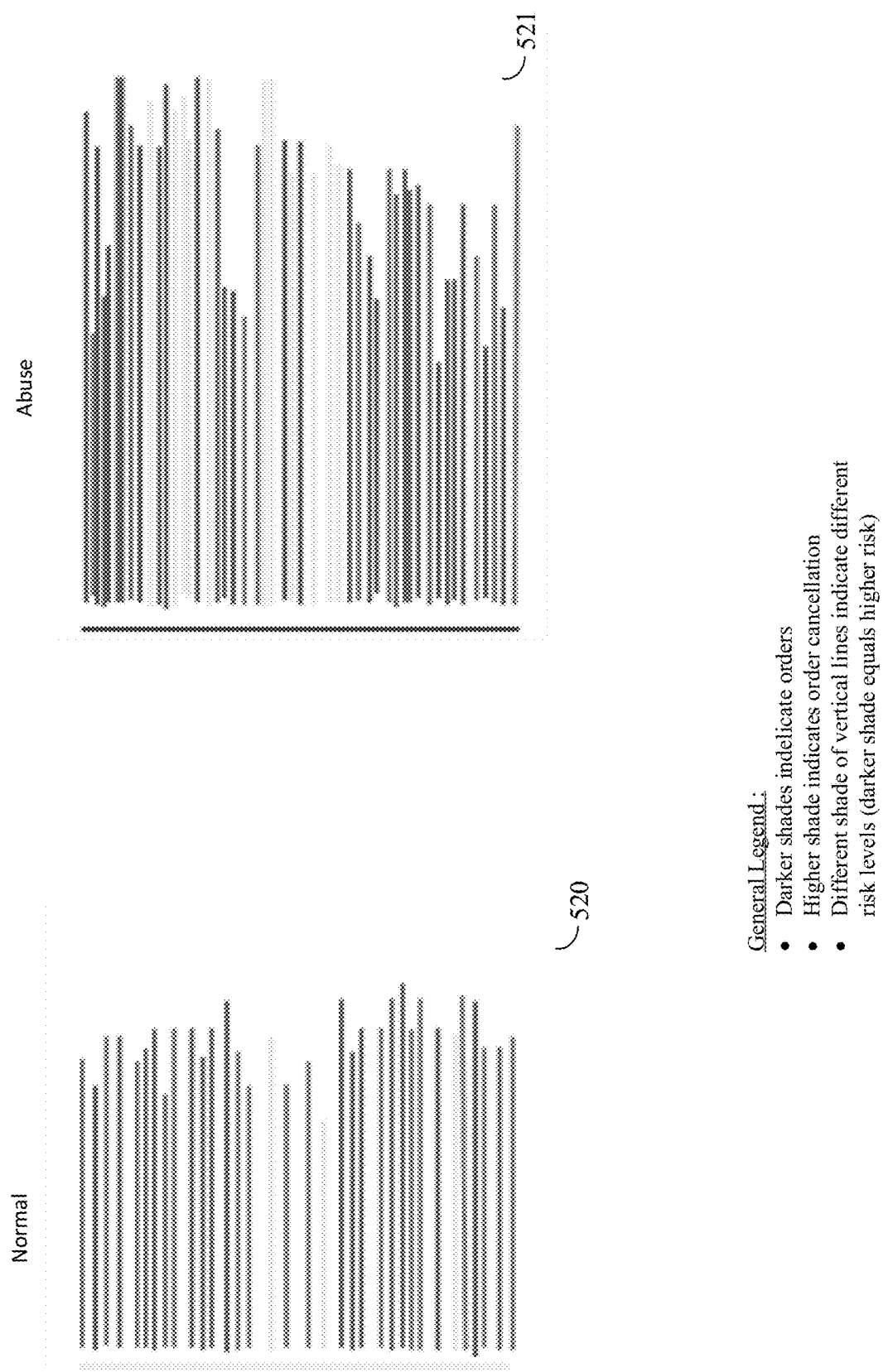
FIG. 5B represents a graphical representation of a normal market pattern versus a market abuse pattern, in accordance with an embodiment of the present invention.
Figure 5C:
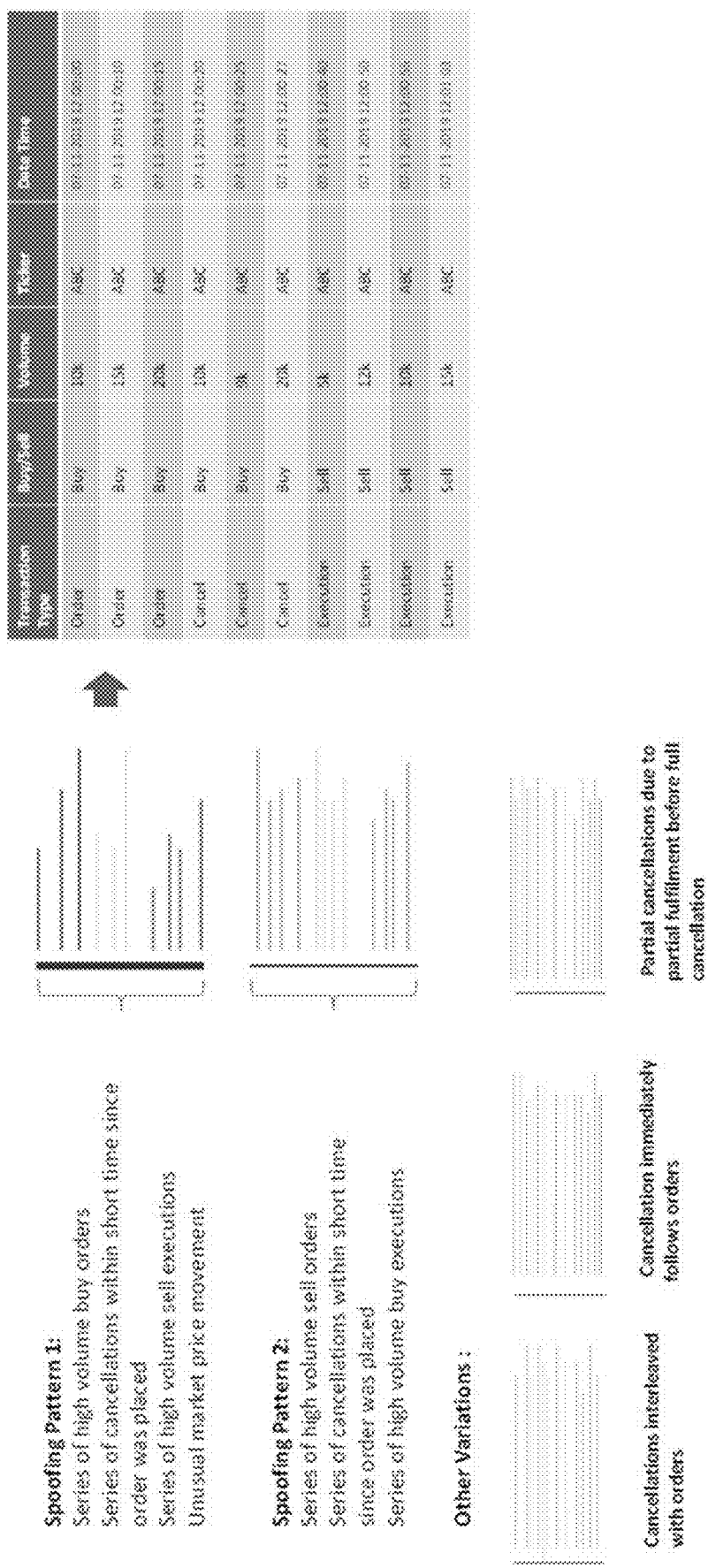
FIG. 5C represents examples of spoofing patterns illustrating a market abuse pattern in accordance with an embodiment of the present invention.

Market abuse happens in certain window of time (see FIGS. 5B and 5C for examples of market abuse patterns). It is noted that Figures are in black and white with a variation in shades of gray. However, in a real-world implementation, colors can be used instead of black and white. FIG. 5B represents examples of graphical representation of a normal versus a market abuse pattern. Normal market pattern (i.e., 520) can be characterized by the following: i) short horizontal lines indicating normal order volumes, ii) random spread of light and dark shades of horizontal lines indicating normal course of orders and cancellations as they would appear in the stock market, and iii) light shade of vertical line indicating low risk of quote price change over the period of time that is being monitored. Abusive pattern (i.e., 521) can be characterized by i) long length of the horizontal lines indicating bulk orders, ii) dark horizontal lines followed immediately by lighter horizontal lines indicating immediate cancellation of the bulk orders, iii) dark shade of the vertical line indicating high risk of quote price change over the period of the time that is being monitored. However, it is worth noting that long length (horizontal line) may not always indicate an abusive pattern. Furthermore, it is noted that the price of individual orders or executions are not part of the horizontal line encoding since the actual price is not relevant in detecting the market abuse pattern. However, a movement in the quote price in the market in the duration of the surveillance window adds to the proof of market abuse. This is indicated as a vertical line since it is not specific to one trade.

FIG. 5C represents examples of spoofing patterns (e.g., pattern 1 and pattern 2).

As is further described herein below, image output component 313 of the present invention provides the capability of encoding market transactions (e.g., trade events, trader communication risk events, trade risk events, etc.), based on rules component 312, as a graphical representation (e.g., vertical and/or horizontal lines). Image output component 313 can utilized any existing graphical/pictorial engine to convert numerical data into pictorial/graphical images, such as, vector base graphical engines.

As is further described herein below, training component 314 of the present invention provides the capability of training a machine learning model to recognized market abuse behavior/pattern. There are at least three different methods to train the machine learning model: i) semi-supervised learning and ii) supervised learning.

Once a market abuse scenario is encoded as a series of graphical images as described by rules component 312, it can be used to train machine learning models that can detect market abuse in day-to-day market data. The challenge of generating sufficient training data with different variations of the pattern can be handled by using a semi-supervised approach. Different scenarios may have different encoding rules but the concept of using a line to represent an event and adding color variations to represent different factors remains the same. Eventually, different encoders can be built and applied for different scenarios. As a side effect of the pattern encoding, once a pattern is detected, the visual representation can be used to "show" the investigator how the pattern looks in the user interface.

The semi-supervised learning approach (refer to FIG. 6) can conform to the following basic principles: i) source some basic data containing the spoofing pattern either from past cases or through a data generation program that is guided by a SME, ii) encode the transactions sourced in principle (i) using the technique described by rules component 212, iii) create a supervised model with the labelled data, iv) source unlabeled life cycled trade transaction data say for a day's duration, v) move a sliding window (of spoofing window size) across the data set and encode the transactions in each as described in rules component 212—output of this steps is a bunch of images with each image representing one window of data, vi) applying an unsupervised clustering model on the un-labelled data windows from principle (v), vii) in the resulting set of clusters short list the ones which have high market price movement (since that is key for spoofing), viii) apply the supervised model from principle (iii) on the clusters from principle (vii) and add the resulting labels to the training set of the supervised model, ix) re-train the supervised model with the new data set, x) repeat steps iv to xiii until the supervised model reaches a better level of accuracy. It is noted that the base line data of normal patterns is obtained from subject matter experts (SME) of a trade domain. It is not practical to manually list all possible combinations of transactions for a specific scenario, a semi-supervised approach (preferred embodiment) can be used to create models which is used by both SME provided data and unsupervised clustering approach to detect abusive patterns.

Figure 6:
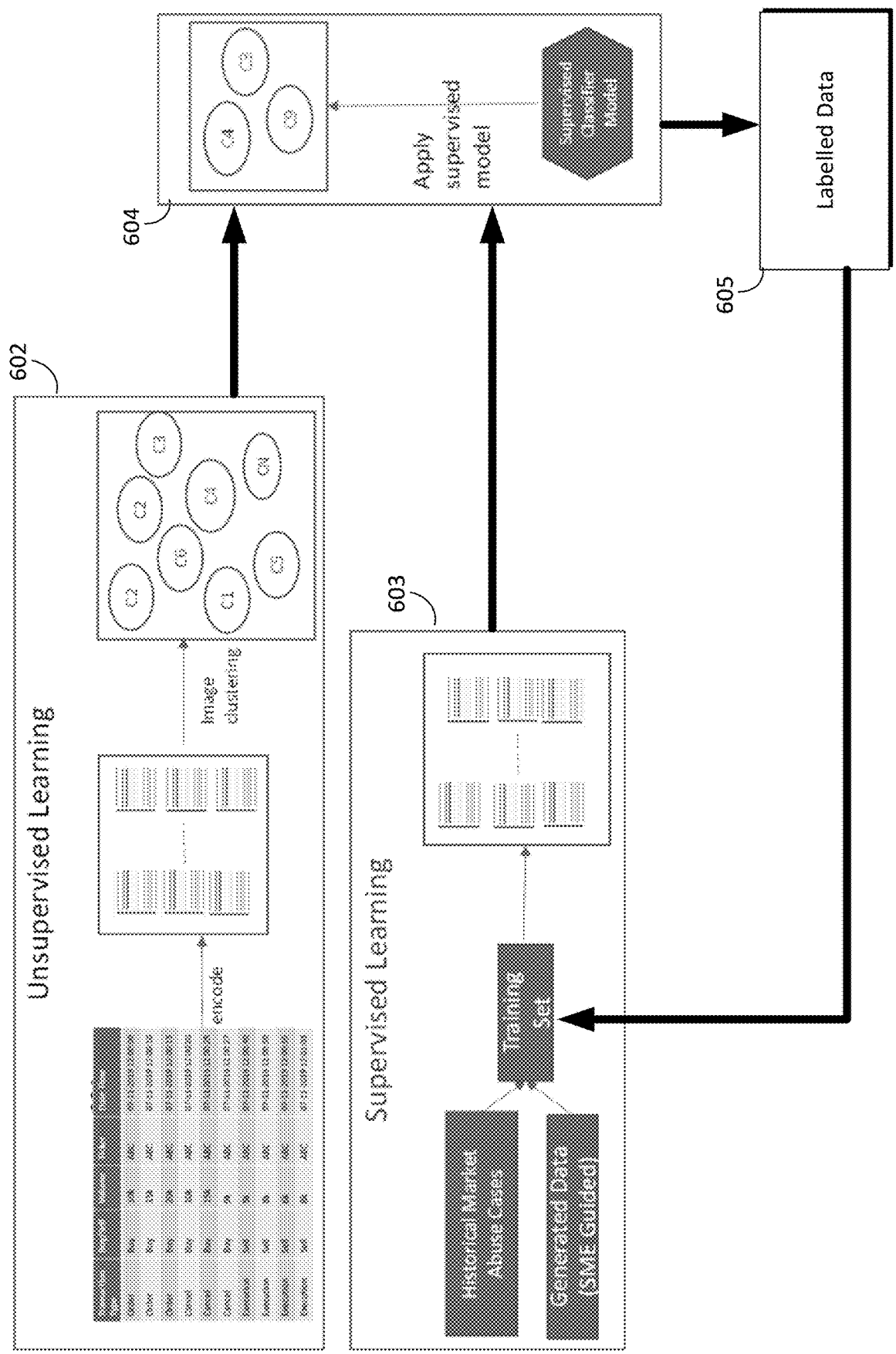
FIG. 6 represents a high-level overview of a semi-supervised training method by machine learning to detect market abuse in day-to-day market data, in accordance with an embodiment of the present invention.

FIG. 6 represents a high-level overview of a semi-supervised training a machine learning model to detect market abuse. Supervised learning 603 uses baseline data to train and outputs a model to be consumed/used by unsupervised learning 602. In 604, embodiment applies the supervised model (output from supervised learning 603) to unsupervised learning 602. After training with the supervised model classifier, the embodiment is able to learn (i.e., detect market abuse pattern) and output labelled data 605. It is noted that C1, C2 through to CN of 602 represents group of image clusters, where the number of clusters are unknown and can range from 1 (i.e., C1) to n (i.e., Cn).

Figure 7:
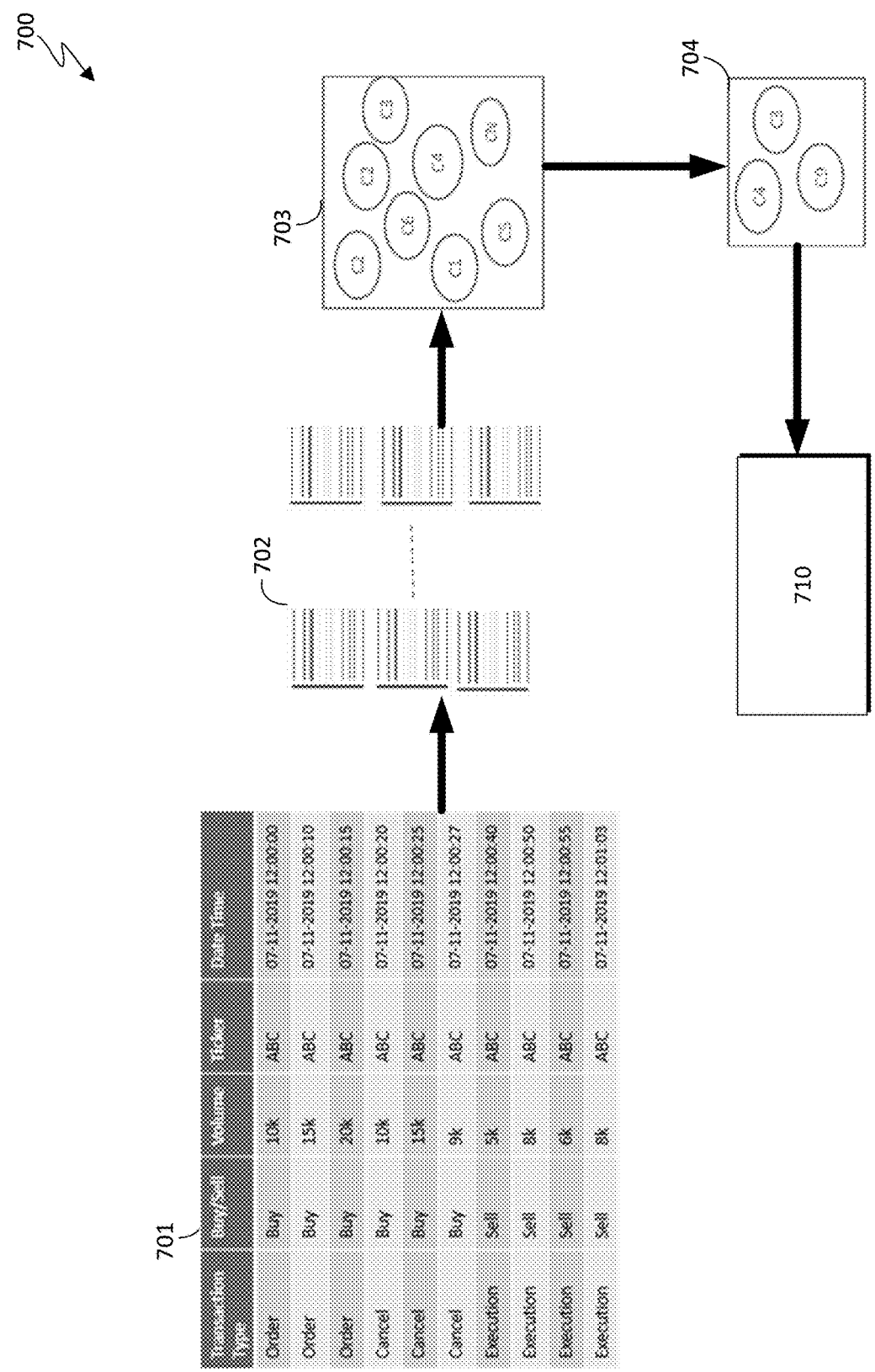
FIG. 7 represents a high-level overview of an unsupervised training method by machine learning to detect market abuse in day-to-day market data, designated as 700, in accordance with an embodiment of the present invention.

Unsupervised learning 602 approach can be further illustrated by FIG. 7. FIG. 7, designated as 700, represents a high-level overview of an unsupervised training a machine learning model to detect market abuse in day-to-day market data. Market data 701 is encoded into graphical representation (i.e., encode data 702) and using image clustering analysis (i.e., 703)s via machine learning, the machine learning is able to reduce the image cluster (i.e., 704) by applying risk factors (e.g., high price movement, high comm. risk and high trader risk) and process the images using color and shape segmentation as output 710. Additionally, output 710 can be used as input to find if there are potential matches in the short listed clusters. It is noted that C1, C2 through to CN of 602 represents group of image clusters, where the number of clusters are unknown and can range from 1 (i.e., C1) to n (i.e., Cn).

However, there are some concepts that needs to be taken in consideration. Some patterns may span multi-days (e.g., collusion, pump and dump). Encode them as risk events computed on a daily basis since mapping each order/execution for multiple days may lead to excessively large images. The encoding can be defined in a meta data file in standard format in XML or JSON. This can then be fed into a generic encoder implementation. Use the same encoding meta data file for training as well as for prediction. Disk space considerations may have to be made for tentatively storing the encoded images for the entire day. Once the prediction is done, the images can be deleted. Each encoded window needs to contain a meta data file which contains the information required to read the actual events that are being encoded. When an abuse pattern is detected, this file can be used to obtain the actual events for investigation and regulatory reporting.

Figure 8:
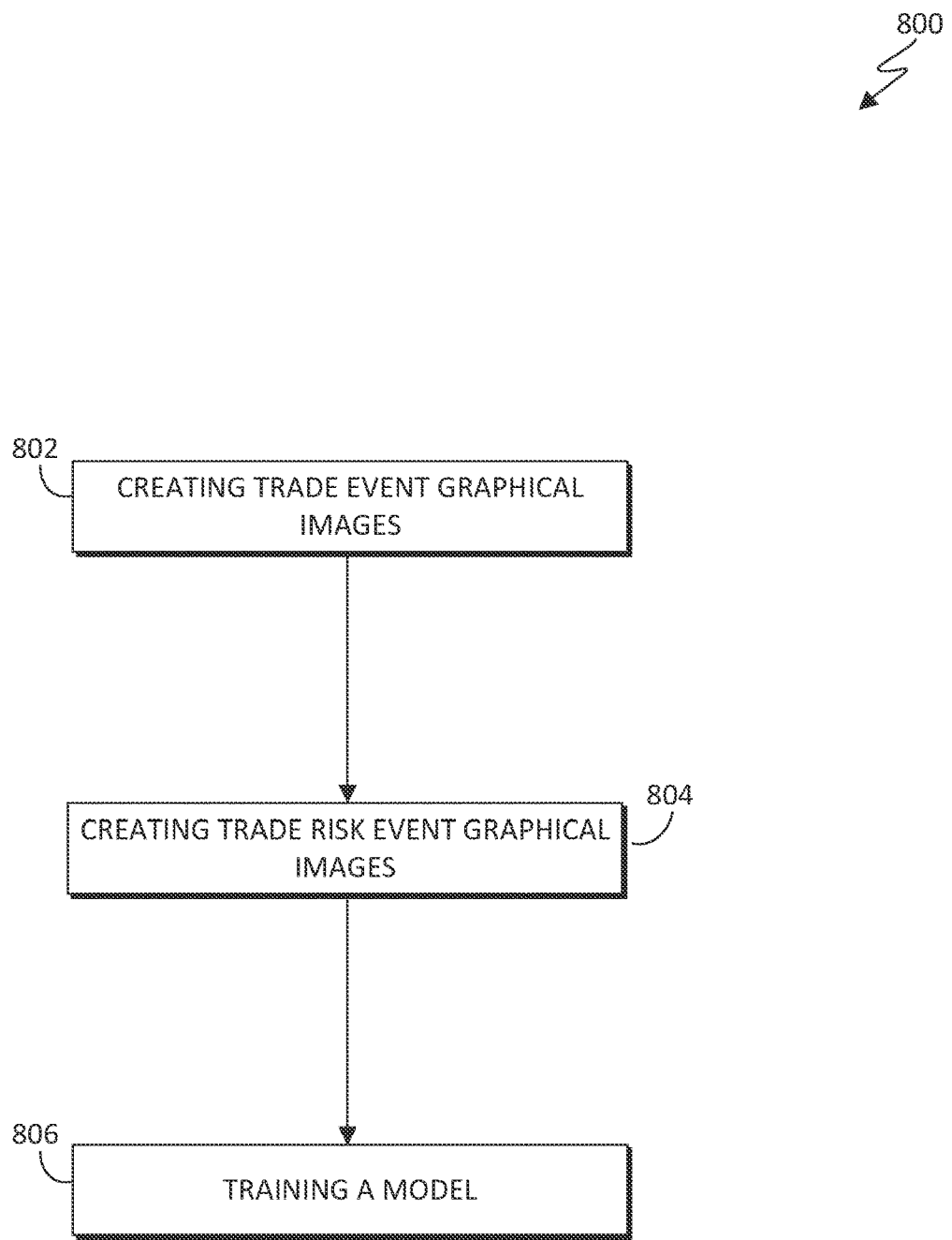
FIG. 8 is a high-level flowchart illustrating the operation of market trading component 211, designated as 800, in accordance with an embodiment of the present invention.

FIG. 8 is a flowchart illustrating the operation of market trading component 211, designated as 800, in accordance with another embodiment of the present invention.

Market trading component 211 creates trade event graphical images (step 802). In an embodiment, market trading component 211, through market data component 311, rules component 312 and image output component 313, encodes graphical representation of the trade events (e.g., trader risk score, trader's comm risk, volume, etc.).

Market trading component 211 creates trade risk event graphical images (step 804). In an embodiment, market trading component 211, through market data component 311, rules component 312 and image output component 313, encodes graphical representation of the trade risk events (e.g., risk level, time).

Market trading component 211 trains model (step 806). In an embodiment, market trading component 211, through training component 314, trains a machine learning network to detect market abuse pattern based on the graphic images, representing trade risk and events.

Figure 9:
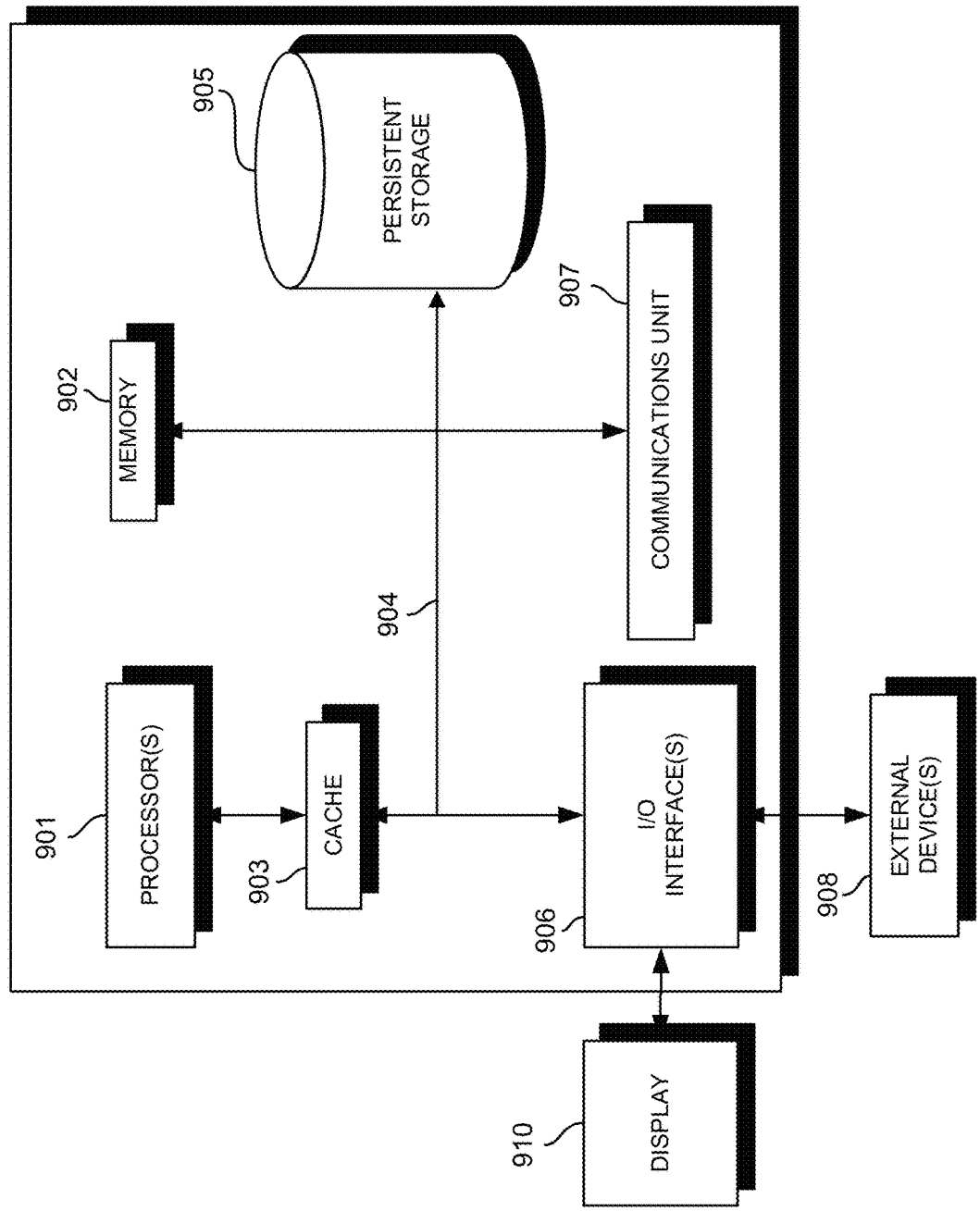
FIG. 9 depicts a block diagram, designated as 900, of components of a server computer capable of executing the market trading component 211 within the market trading environment, of FIG. 2, in accordance with an embodiment of the present invention.

FIG. 9, designated as 900, depicts a block diagram of components of market trading component 211 application, in accordance with an illustrative embodiment of the present invention. It should be appreciated that FIG. 9 provides only an illustration of one implementation and does not imply any limitations with regard to the environments in which different embodiments may be implemented. Many modifications to the depicted environment may be made.

FIG. 9 includes processor(s) 901, cache 903, memory 902, persistent storage 905, communications unit 907, input/output (I/O) interface(s) 906, and communications fabric 904. Communications fabric 904 provides communications between cache 903, memory 902, persistent storage 905, communications unit 907, and input/output (I/O) interface(s) 906. Communications fabric 904 can be implemented with any architecture designed for passing data and/or control information between processors (such as microprocessors, communications and network processors, etc.), system memory, peripheral devices, and any other hardware components within a system. For example, communications fabric 904 can be implemented with one or more buses or a crossbar switch.

Memory 902 and persistent storage 905 are computer readable storage media. In this embodiment, memory 902 includes random access memory (RAM). In general, memory 902 can include any suitable volatile or non-volatile computer readable storage media. Cache 903 is a fast memory that enhances the performance of processor(s) 901 by holding recently accessed data, and data near recently accessed data, from memory 902.

Program instructions and data (e.g., software and data x10) used to practice embodiments of the present invention may be stored in persistent storage 905 and in memory 902 for execution by one or more of the respective processor(s) 901 via cache 903. In an embodiment, persistent storage 905 includes a magnetic hard disk drive. Alternatively, or in addition to a magnetic hard disk drive, persistent storage 905 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 905 may also be removable. For example, a removable hard drive may be used for persistent storage 905. Other examples include optical and magnetic disks, thumb drives, and smart cards that are inserted into a drive for transfer onto another computer readable storage medium that is also part of persistent storage 905. Market trading component 211 can be stored in persistent storage 905 for access and/or execution by one or more of the respective processor(s) 901 via cache 903.

Communications unit 907, in these examples, provides for communications with other data processing systems or devices. In these examples, communications unit 907 includes one or more network interface cards. Communications unit 907 may provide communications through the use of either or both physical and wireless communications links. Program instructions and data (e.g., Market trading component 211) used to practice embodiments of the present invention may be downloaded to persistent storage 905 through communications unit 907.

I/O interface(s) 906 allows for input and output of data with other devices that may be connected to each computer system. For example, I/O interface(s) 906 may provide a connection to external device(s) 908, such as a keyboard, a keypad, a touch screen, and/or some other suitable input device. External device(s) 908 can also include portable computer readable storage media, such as, for example, thumb drives, portable optical or magnetic disks, and memory cards. Program instructions and data (e.g., Market trading component 211) used to practice embodiments of the present invention can be stored on such portable computer readable storage media and can be loaded onto persistent storage 905 via I/O interface(s) 906. I/O interface(s) 906 also connect to display 910.

Display 910 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. I t will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for training a machine learning model to detect market abuse patterns based on graphical images, the computer-implemented method comprising: creating, by one or more computer processors, trade event graphical images based on one or more rules, wherein underlying data of the trade event graphic images are associated with financial transactions; creating, by the one or more computer processors, trade risk event graphical images represented by one or more horizontal lines and one or more vertical lines wherein the one or more vertical lines are based on unstructured data from the financial transactions, wherein the underlying data of the trade risk event graphical images are associated with key market risk indicators; receiving a baseline training data associated with spoofing patterns; encoding the baseline training data with one or more labels based on the one or more rules, wherein the encoded baseline training data comprises of the trade event graphical images and the trade risk event graphical images; creating one or more supervised model with the one or more labeled associated with the baseline training data; receiving unlabeled data associated with life cycle trade transaction; moving a sliding window across the unlabeled data and the baseline training data; applying unsupervised clustering model on the unlabeled data; applying the one or more supervised model on the unsupervised clustering model; and adding one or more resulting labels to the one or more supervised model.

2. The computer-implemented method of claim 1, wherein the one or more rules further comprises, but it is not limited to, i) fixed size slot to indicate a trader's risk score, ii) different colors for high, medium and low, iii) fixed sides slot can be used to indicate the comm. (communication) risk level, iv) different colors can be used for high, medium or low, v) areas can be further divided into multiple segments for different communication indicators if required, vi) variable length based on the volume, vii) color based on type and direction, viii) start and end time of the vent determines the starting position and height of the line, ix) different colors can be used for high, medium and low risk levels and x) gradients can be used to show increase or decrease.

3. The computer-implemented method of claim 1, the one or more horizontal lines are encoded based on type, direction, volume, time stamp, trader's risk score and trader's communication risk.

4. The computer-implemented method of claim 1, the one or more vertical lines are encoded based on risk level and time duration.

5. The computer-implemented method of claim 1, wherein the unstructured data further comprises trader's communication.

6. The computer-implemented method of claim 1, wherein the trade event graphical images further comprises trader's risk score and trader's comm. risk events.

7. The computer-implemented method of claim 1, wherein the trade risk event graphical images further comprises market risk indicators.

8. The computer-implemented method of claim 1, wherein training the model of a machine learning network to detect market abuse patterns further comprises:
using, by the one or more computer processors, a baseline data to train and output a supervised model during supervised learning; and
training, by the one or more computer processors, a machine learning model based on the supervised model.

9. A computer system for training a machine learning model to detect market abuse patterns based on graphical images, the computer system comprising:
one or more computer processors;
one or more computer readable storage media;
program instructions stored on the one or more computer readable storage media for execution by at least one of the one or more computer processors, the program instructions comprising:
program instructions to create trade event graphical images based on one or more rules, wherein underlying data of the trade event graphic images are associated with financial transactions;
program instructions to create trade risk event graphical images represented by one or more horizontal lines and one or more vertical lines wherein the one or more vertical lines are based on unstructured data from the financial transactions, wherein the underlying data of the trade risk event graphical images are associated with key market risk indicators;
program instructions to receive a baseline training data associated with spoofing patterns;
program instructions to encode the baseline training data with one or more labels based on the one or more rules, wherein the encoded baseline training data comprises of the trade event graphical images and the trade risk event graphical images;
program instructions to create one or more supervised model with the one or more labeled associated with the baseline training data;
program instructions to receive unlabeled data associated with life cycle trade transaction;
program instructions to move a sliding window across the unlabeled data and the baseline training data;
program instructions to apply unsupervised clustering model on the unlabeled data;
program instructions to apply the one or more supervised model on the unsupervised clustering model; and
program instructions to add one or more resulting labels to the one or more supervised model.

10. The computer system of claim 9, wherein the one or more rules further comprises, but it is not limited to, i) fixed size slot to indicate a trader's risk score, ii) different colors for high, medium and low, iii) fixed sides slot can be used to indicate the comm. (communication) risk level, iv) different colors can be used for high, medium or low, v) areas can be further divided into multiple segments for different communication indicators if required, vi) variable length based on the volume, vii) color based on type and direction, viii) start and end time of the vent determines the starting position and height of the line, ix) different colors can be used for high, medium and low risk levels and x) gradients can be used to show increase or decrease.

11. The computer system of claim 9, the one or more horizontal lines are encoded based on type, direction, volume, time stamp, trader's risk score and trader's communication risk.

12. The computer system of claim 9, the one or more vertical lines are encoded based on risk level and time duration.

13. The computer system of claim 9, wherein the unstructured data further comprises trader's communication.

14. The computer system of claim 9, wherein the trade event graphical images further comprises trader's risk score and trader's comm. risk events.

15. The computer system of claim 9, wherein the trade risk event graphical images further comprises market risk indicators.

16. The computer system of claim 9, wherein training the model of a machine learning network to detect market abuse patterns further comprises:
   program instructions to use a baseline data to train and output a supervised model during supervised learning; and
   program instructions to train a machine learning model based on the supervised model.

17. A computer program product for training a machine learning model to detect market abuse patterns based on graphical images, the computer program product comprising:
   one or more computer readable storage media and program instructions stored on the one or more computer readable storage media, the program instructions comprising:
      program instructions to create trade event graphical images based on one or more rules, wherein underlying data of the trade event graphic images are associated with financial transactions;
      program instructions to create trade risk event graphical images represented by one or more horizontal lines and one or more vertical lines wherein the one or more vertical lines are based on unstructured data from the financial transactions, wherein the underlying data of the trade risk event graphical images are associated with key market risk indicators;
      program instructions to receive a baseline training data associated with spoofing patterns;
      program instructions to encode the baseline training data with one or more labels based on the one or more rules, wherein the encoded baseline training data comprises of the trade event graphical images and the trade risk event graphical images;
      program instructions to create one or more supervised model with the one or more labeled associated with the baseline training data;
      program instructions to receive unlabeled data associated with life cycle trade transaction;
      program instructions to move a sliding window across the unlabeled data and the baseline training data;
      program instructions to apply unsupervised clustering model on the unlabeled data;
      program instructions to apply the one or more supervised model on the unsupervised clustering model; and
      program instructions to add one or more resulting labels to the one or more supervised model.

18. The computer program product of claim 17, wherein the one or more rules further comprises, but it is not limited to, i) fixed size slot to indicate a trader's risk score, ii) different colors for high, medium and low, iii) fixed sides slot can be used to indicate the comm. (communication) risk level, iv) different colors can be used for high, medium or low, v) areas can be further divided into multiple segments for different communication indicators if required, vi) variable length based on the volume, vii) color based on type and direction, viii) start and end time of the vent determines the starting position and height of the line, ix) different colors can be used for high, medium and low risk levels and x) gradients can be used to show increase or decrease.

19. The computer program product of claim 17, wherein training the model of a machine learning network to detect market abuse patterns further comprises:
   program instructions to use a baseline data to train and output a supervised model during supervised learning; and
   program instructions to train a machine learning model based on the supervised model.

20. The computer program product of claim 17, wherein the unstructured data further comprises trader's communication.

* * * * *